United States Patent

[11] 3,624,022

[72] Inventor Marcus E. Ross
 Midland, Mich.
[21] Appl. No. 24,825
[22] Filed Apr. 1, 1970
[45] Patented Nov. 30, 1971
[73] Assignee Dow Corning Corporation
 Midland, Mich.
 Continuation-in-part of application Ser. No. 1,841, Jan. 9, 1970, now abandoned. This application Apr. 1, 1970, Ser. No. 24,825

[54] ROOM TEMPERATURE CURING ORGANOPOLYSILOXANES
 14 Claims, No Drawings

[52] U.S. Cl. ................................................ 260/37 SB, 260/46.5 G
[51] Int. Cl. ........................................................ C08g 51/04
[50] Field of Search ....................................... 260/37 SB, 46.5 G, 18 S

[56] References Cited
UNITED STATES PATENTS

| | | | |
|---|---|---|---|
| 3,065,194 | 11/1962 | Nitzsche et al. | 260/46.5 G X |
| 3,110,689 | 11/1963 | Smith | 260/37 SB X |
| 3,179,619 | 4/1965 | Brown | 260/37 SB |
| 3,386,945 | 6/1968 | Bartell et al. | 260/46.5 G X |

*Primary Examiner*—Lewis T. Jacobs
*Attorneys*—Robert F. Fleming, Jr., Laurence R. Hobey, Harry D. Dingman and Roger H. Borrousch ABSTRACT: Compositions comprising 100 parts of a hydroxyl-terminated polymer of $RR_fSiO$- units, in which R is a lower alkyl radical and $R_f$ is a beta-perfluoroalkylethyl radical, 0.5–20 parts of a silane of the formula $R'SiX_3$, in which R' is a phenyl or vinyl radical or mixtures thereof and X is a methoxy or ethoxy radical; and 0.1 to 10 parts of certain metal salts of carboxylic acids, such as stannous octoate, will cure at room temperature to give reversion resistant fluorosilicone elastomers.

ROOM TEMPERATURE CURING ORGANOPOLYSILOXANES

Specification

This application is a continuation-in-part of Serial Number 1,841, filed Jan. 9, 1970 now abandoned.

This invention relates to organopolysiloxane compositions which cure at room temperature. In one aspect, the invention relates to fluorosilicone elastomers of improved reversion resistance.

Room temperature curing (RTV) organosiloxane compositions are well-known. In on specific RTV system, a hydroxyl-endblocked diorganopolysiloxane is mixed with an organosilicate, such as ethylorthosillicate or methyltrimethoxysilane, and cured at room temperature in the presence of certain metallic salts of carboxylic acids, such as lead octoate or tin naphthenate. The elastomeric materials prepared from fluorosilicone polymers by means of the above-described RTV system are unsuitable for certain applications because they tend to revert and lose their physical properties at high temperatures.

By the practice of the present invention, wherein selected trifunctional cross-linking agents, such as phenyltriethoxysilane, are used in conjunction with the hydroxyl-terminated fluorosilicone and catalysts, reversion of the cured material is minimized or eliminated.

Accordingly, it is an object of the invention to provide an improved room temperature curing organopolysiloxane composition.

Another object of the invention is to provide a reversion resistant fluorosilicone elastomer.

In accordance with the invention there is provided a curable composition consisting essentially of (a) 100 parts by weight of a hydroxyl-endblocked polysiloxane of units of the formula $RR_fSiO-$, in which R is a lower alkyl radical of from one to six 6 inclusive carbon atoms and $R_f$ is a beta-perfluoroalkylethyl radical of from three to 12 inclusive carbon atoms, said polymer having a viscosity of at least 100 cs. at 25° C.; (b) 0.5 to 20 parts by weight of a silane of the formula $R'SiX_3$ in which R' is selected from the group consisting of a phenyl radical, a vinyl radical and mixtures thereof and X IS A methoxy or ethoxy radical; and (c) 0.1 to 10 parts by weight of a carboxylic acid salt of metals ranging from lead to manganese inclusive in the electromotive series of metals.

The fluorosilicone polymers (a) are known in the art and include those having units of the formula $(CH_3)(CF_3CH_2CH_2)SiO-$, $(CH_3)(C_4F_9CH_2CH_2)SiO-$, $(C_2H_5)(C_6F_{13}CH_2CH_2)SiO-$, $(C_4H_9)(C_3F_7CH_2CH_2)SiO$, $(C_6H_3)(C_2F_5CH_2CH_2)SiO-$ and $(CH_3)(C_{10}F_{21}CH_2CH_2)SiO-$. These polymers are prepared by hydrolysis and condensations of silanes of the formula $RR_fSiY_2$ in which Y is a hydrolyzable group, such as chlorine. Conventional hydrolysis and condensation techiques are utilized, thus there are no critical conditions other than those well-known in the art.

The polymers can have a viscosity OF 100 cs. (centristokes) or higher, measured at 25° C. In applications where the uncured composition is to be pourable (i.e., when encapsulating electronic components) the viscosities range from 100 to 10,000 cs. For flowable materials, such as sealants, viscosities of from about 10,000 to 200,000 cs. are preferred. Nonflowable formulations utilize polymers having viscosities of from about 200,000 to 2 million cs. and higher. Blends of polymers having different viscosities can be used. It is understood in the art that nomoorganosilaxane and $SiO_2$ units can be present, provided that these types of units are not present in amounts sufficient to affect the essential diorgano character of the polymer. When present, these latter units ordinarily constitute less than 1 percent of the siloxane units. "Hydroxyl-endblocked" is taken to mean that at least 50 percent of the endblocking units are hydroxyl groups and that triorganosilyl endblocking units can be present in the polymer.

The silanes, $R'SiX_3$ function as cross-linking agents for the RTV system and are selected from the group consisting of phenyltrimethoxysilane, phenyltriethoxysilane, vinyltrimethoxysilane, vinyltriethoxysilane and mixtures thereof. The use of these specific silane cross-linkers results in the reversion resistance of the cured product.

Curing of the mixture of polymer and cross-linkig agent is catalyzed by the addition of from 0.1 to 10 parts by weight of the carboxylic acid salt of metals ranging from lead to manganese in the electromotive series of metals. Specifically, these metals are lead, tin, nickel, cobalt, iron, cadmium, chromium, zinc and manganese. Any carboxylic acid salt of these metals is operative as a catalyst. It is preferred that the carboxylic acid radical contain no more than 16 carbon atoms. It is also preferred that the metal salt be soluble in the siloxane although insoluble salts may be utilized if they are properly dispersed in the mixture. A dispersion can be formed by employing a solution of a catalyst in a mutual solvent with the fluorosilicone polymer or the catalyst may be dispersed on a filler and thereafter milled into the siloxane.

The term "carboxylic acid salt" as employed herein is inclusive of those salts in which a hydrocarbon radical is attached to the metal, for example, (five-tin diacetate. Specific examples of salts utilized in the practice of the invention are the naphthenates of the above metals, such as lead naphthenate, (0.1 napthenate and two naphthenate; salts of fatty acids, such as iron 2 -ethylhexate, chromium octoate and lead 2 ethylhexoate; salts of aromatic carboxylic acids, such as dibutyl tin dibenzoate; salts of polycarboxylic acids, such as dibutlyltin adipate and lead sebacate and salts of hydroxy carboxylic acids, such as dibutyl tin dilactate. A mixture of two or more of the defined catalysts can be used if desired.

The amount of catalyst will be varied depending upon the particular use for the product. For example, when a fast cure is desired, large amounts of catalyst (five -10 parts) are used. In applications where extensive fabrication time is requiredand it is necessary to delay curing, lesser amounts 0.1one -2 parts) of catalyst may be employed.

If desired, fillers can be incorporated into the curable compositions of the invention. Suitable fillers include organic materials, such as wood flour, cork, cotton linters and organic fabrics or inorganic materials, such as glass calcium carbonate, asbestos, crushed quartz, titania zinc oxide and silica powder. Fume silicas, silica aerogels and precipitated silicas of high surface area are preferred as reinforcing fillers. The use of hollow glass microspheres or "glass ballons" as the filler gives a low density material which is especially suitable as a sealant in aircraft fuel tanks. These fillers can be present in amounts in the range of from about 10 to 200 parts by weight of filler per 100 parts by weight of the curable composition depending upon the use of the product. For example, when formulating a sealant it is preferred to use from 10 to 50 parts filler per 100 parts of the composition.

In addition to the above fillers, the compositions of the invention can include additives, such as pigments, sunscreen agents, oxidation inhibitors and dielectric materials, for example graphite and carbon black.

THe compositions of the invention may be compounded in the usual manner for compounding siloxane formulations, such as by mixing on a three-roll mill. If the materials are to be stored prior to use, it is necessary that the cross-linking agent or the catalyst be stored separately. The polymer, cross-linking agent and, optionally, a filler can be compounded with the catalyst being added just prior to use, or the polymer, catalyst and filler can be compounded with the cross-linking agent being added just prior to use.

Curing of the compositions takes place spontaneously at room temperature upon mixing of the three components. The curing time will vary depending up on the amount of cross-linker and catalyst present, but curing will generally be complete in 24 hours. If desired, the compositions of the invention can be cured under pressure at temperatures of from 150° to 250° C. to form molded articles.

Because of the use of the specific cross-linkers, the cured compositions of the invention are resistant to reversion as compared to fluorosilicone compositions utilizing others of the numerous cross-linkers suggested in the art. When the cured compositions of the invention are heated for long periods of time, for example 7 days at 200° C., they retain their physical properties. This is to be contrasted with similar formulations utilizing other than the defined cross-linkers which exhibit a great and sometimes complete loss of properties when heated for long periods of time.

The following examples are illustrative and are not intended to limit the invention, the scope of which is properly delineated in the claims. In the examples all "parts" designated are "parts by weight" an the viscosities are at 25° C. The "mixing" of the components of the base formulation, the components of the curing agent and the base with the curing agent was, in all examples, accomplished on a 3-roll mill.

EXAMPLE 1

A formulation containing 100 parts of a hydroxyl-endblocked 3,3,3-trifluoropropylmethylpolysiloxane having a viscosity of 15,000 cs., five parts of phenyltrimethoxylsilane and 0.5 parts of dibutyl tin diacetate was mixed and allowed to cure at room temperature Curing was complete in about 8 hours to give an elastomeric sealant. After 48 hours at room temperature the cured material was heated in an oven at 250° C. for 8 hours. The heated material showed no signs of softening or losing its physical properties When a similar composition is formulated using ethylorthosilicate instead of phenyltrimethoxy silane, cured at room temperature and then subjected to the same heat treatment, the material reverts rapidly.

EXAMPLE 2

A formulation consisting of 100 parts of a hydroxyl-endblocked 3,3,3-trifluoropropylmethylpolysiloxane having a viscosity of 15,000 cs., eight parts of phenyltrimethoxysilane, 75 parts of crushed quartz (filler) and 0.5 dibutyl tin diacetate cured to an elastomer in about 2 hours at room temperature. After 24 hours at 220° C., the material had not reverted.

EXAMPLE 3

A base formulation was prepared which consisted of 100 parts of the polymer used in examples 1 and 2, 20 parts of a silazane-treated silica, five parts of crushed quartz, 0.5 parts of carbon black and 0.75 parts of dibutyl tin diacetate. One part of a cross-linker formulation of seven parts of phenyltrimethoxysilane and five parts of the polymer was mixed with the 10 parts of the base and the mixture was allowed to cure at room temperature. After 7 days at room temperature properties of a sample of the cured material were determined. Other samples were placed in an oven heated to 200° C. and properties were determined after 1 and 7 days heating. The data is tabulated below.

| Physical properties after— | Durometer | Tensile strength (p.s.i.) | Elongation at break (percent) | Tear strength (p.s.i.) |
|---|---|---|---|---|
| 7 days/RT | 35 | 408 | 220 | 44 |
| 24 hrs./200° C | 35 | 550 | 240 | 41 |
| 7 days/200° C | 34 | 464 | 240 | 42 |

It is apparent from the data that the cured material did not soften after 7 days at 200° C. nor did it lose its strength.

EXAMPLE 4

The following compositions were formulated and cured at room temperature. The properties of each composition were determined after 7 days at room temperature, 24 hours at 200° C. and 7 days at 200° C. In all formulations, the polymer utilized was hydroxyl endblocked 3,3,3-trifluoropropylmethylpolysiloxane having the indicated viscosity. In all compositions, one part catalyst formulation was mixed with 10 parts of the base formulation. The specific compositions and their properties are given in the tales below:

COMPOSITIONS

| No. 1 | No. 2 |
|---|---|
| Base —parts<br>Parts:<br>100 —polymer (15,000 cs.)<br>6 —$\phi Si(OC_3)_3$<br>0.5 —carbon black<br>15 —treated silica | Base —10 parts<br>Parts:<br>100 —polymer (40,000 cs.).<br>8 —$\phi Si(OCH_3)_3$<br>0.5 —carbon black.<br>15 —treated silica. |
| Catalyst—1 part | Catalyst—1 part |
| 8—polymer (15,000 cs.)<br>1—dibutyltin diacetate<br>4—iron oxide | 9—polymer (15,000 cs.).<br>0.5—dibutyltin diacetate.<br>3—ferric oxide. |

| No. 3 | No. 4 |
|---|---|
| Base —10 parts<br>Parts:<br>100 —polymer (40,000 cs.)<br>7 $\phi Si(OCH_3)_3$<br>1 —carbon black<br>15 —treated silica | Bzse —10 parts<br>Parts:<br>100 —polymer (40,000 cs.).<br>7 —$\phi Si(OCH_3)_3$.<br>1 —carbon black.<br>15 —treated silica. |
| Catalyst —1 part | Catalyst —1 part |
| 9 —polymer (15,000)<br>0.75 —dibutyltin diacetate<br>3 —ferric oxide | 9 —polymer (15,000 cs.).<br>0.75 —dibutyltin diacetate.<br>3 —zirconium silicate. |

| No. 5 | No. 6 |
|---|---|
| Base —10 parts<br>Parts:<br>100 —polymer (120,000 cs.)<br>25 —trimethylsiloxy-endblocked trifluoropropylmethylpolysiloxane (1,000 cs.)<br>7 —$\phi Si(OCH_3)_3$<br>1 —carbon black<br>15 —treated silica | Base —10 parts<br>Parts:<br>100 —polymer (40,000 cs.).<br>5 —$\phi Si(OCH_3)_3$.<br>1 —carbon black.<br>20 —treated silica. |
| Catalyst | Catalyst |
| 11—polymer (40,000 cs.)<br>0.5—dibutyltin diacetate<br>3 —zirconium silicate | 11—polymer (40,000 cs.).<br>0.5—dibutyltin diacetate.<br>3 —zirconium silicate. |

| | Physical properties | | | | | | | | | | | |
|---|---|---|---|---|---|---|---|---|---|---|---|---|
| | 7 days/room temp. | | | | 24 hrs./200° C. | | | | 7 days/200° C. | | | |
| Compositions | D[1] | T[2] | E[3] | T[4] | D | T | E | T | D | T | E | T |
| Number: | | | | | | | | | | | | |
| 1 | 41 | 391 | 180 | 33 | 40 | 365 | 230 | 33 | 30 | 311 | 280 | 36 |
| 2 | 29 | 345 | 290 | 52 | 33 | 363 | 290 | 44 | 29 | 296 | 270 | 45 |
| 3 | 40 | 232 | 200 | 55 | 43 | 443 | 290 | 45 | 35 | 347 | 270 | 34 |
| 4 | 39 | 258 | 200 | 56 | 43 | 297 | 220 | 44 | 37 | 329 | 240 | 39 |
| 5 | 29 | 210 | 280 | 34 | 30 | 267 | 350 | 30 | 24 | 254 | 350 | 42 |
| 6 | 30 | 419 | 250 | 56 | 34 | 540 | 280 | 52 | 34 | 455 | 280 | 59 |

[1] Durometer.
[2] Tensile strength (p.s.i.).
[3] Elongation, percent at break.
[4] Tear strength (p.s.i.) die B This data demonstrates the reversion resistance of various sealant formulations. Similar formulations have retained their physical properties for as long as 28 days at 220° C.

EXAMPLE 5

When vinyltriethoxysilane is substituted for the cross-linking agent of example 1 in a similar formation, there is obtained an elastomeric sealant of the same general properties.

Reasonable modification and variation are within the scope of the invention which is directed to novel curable fluorosilicone compositions.

Example 6

A. A base formulation containing 100 parts of a hydroxyl-endblocked 3,3,3-trifluoropropylmethylpolysiloxane having a viscosity of 15,000 cs., 20 parts of a silica filler treated with hexamethyldisilazane, 0.5 part of carbon black and 0.7 part of dibutyltindiacetate and a cross-linking composition containing five parts of a mixture of 50 weight percent phenyltrimethoxysilane and 50 weight percent vinyltrimethoxysilane, five parts of a hydroxyl endblocked 3,3,3-trifluoropropylmethylpolysiloxane having a viscosity of 40,000 cs. and two parts of fume silica filler were prepared. Ten parts of the base formulation and one part of the cross-linking composition were mixed and allowed to cure for 7 days at room temperature. The physical properties were then determined on one sample of the cured silicone rubber and another sample was placed in an oven at 232° C. The physical properties of the silicone rubber were then determined after seven days in the 232° C. oven.

B. Another composition was prepared as described above except five parts of phenyltrimethoxysilane was used in place of the mixture of phenyltrimethoxysilane and vinyltrimethoxysilane. The physical properties were also determined after curing for 7 days at room temperature and after heating for 7 days at 232° C. The results at the higher temperature showed that the mixture of phenyltrialkoxysilane and vinyltrialkoxysilane had improved reversion resistance over the phenyltrialkoxysilane alone. The results were as shown in the following table.

| Composition | After 7 Days At Room Temperature | | | After 7 Days At 232° C. | | |
|---|---|---|---|---|---|---|
| | D | T | E | D | T | E |
| A. | 47 | 340 | 120 | 41 | 250 | 140 |
| B. | 37 | 255 | 180 | 27 | 115 | 195 |

That which is claimed is:

1. A cured composition prepared by mixing the ingredients consisting essentially of:
   a. 100 parts by weight of a hydroxyl-endblocked polysiloxane of units of the formula RR$_f$SiO-, in which R is a lower alkyl radical of from one to six inclusive carbon atoms and R$_f$ is a beta-perfluoroalkylethyl radical of from three to 12 inclusive carbon atoms, said polysiloxane having a viscosity of at least 100 cs. at 25° C.
   b. 0.5 to 20 parts by weight of a silane of the formula R'SiX$_3$ in which R' is selected from a group consisting of a phenyl radical, a vinyl radical and mixtures thereof and X is a methoxy or ethoxy radical; and
   c. 0.1 to 10 parts by weight of a carboxylic acid salt of metals ranging from lead to manganese inclusive in the electromotive series of metals.

2. The composition of claim 1 wherein the polysiloxane
   a. consists essentially of CF$_3$CH$_2$CH$_2$(CH$_3$)SiO- units.

3. The composition of claim 1 wherein the silane (b) is phenyltrimethoxysilane.

4. The composition of claim 1 wherein (c) is dibutyl tin diacetate.

5. The composition of claim 1 wherein the silane (b) is a mixture of phenyltrimethoxysilane and vinyltrimethoxysilane.

6. The composition of claim 1 wherein a filler is also present.

7. The composition of claim 3 wherein a filler is also present.

8. The composition of claim 5 wherein a filler is also present.

9. The composition of claim 6 including from about 10 to 200 parts by weight of a filler per 100 parts by weight of the curable composition.

10. The composition of claim 9 wherein the filler is silica.

11. The composition of claim 9 wherein said filler is present in an amount in the range of about 10 to 50 parts by weight per 100 parts by weight of the curable composition.

12. The composition of claim 11 wherein the filler material is hollow glass spheres.

13. In accordance with claim 1, a cured sealant composition prepared by mixing the ingredients consisting essentially of:
   a. 100 parts by weight of hydroxyl-endblocked 3,3,3-trifluoropropylmethylpolysiloxane having a viscosity of from 10,000 to 200,000 cs. at 25° C.;
   b. from 0.5 to 20 parts by weight of phenyltrimethoxysilane,
   c. from 0.1 to 10 parts by weight of dibutyl tin diacetate, and
   d. from 10 to 50 parts by weight per 100 parts of the mixture of (a), (b) and (c), of silica filler.

14. In accordance with claim 1, a cured sealant composition prepared by mixing the ingredients consisting essentially of:
   a. 100 parts by weight of hydroxyl-endblocked 3,3,3-trifluoropropylmethylpolysiloxane having a viscosity of from 10,000 to 200,000 cs. at 25° C.,
   b. from 0.5 to 20 parts by weight of a mixture of phenyltrimethoxysilane and vinyltrimethoxysilane,
   c. from 0.1 to 10 parts by weight of dibutyl tin diacetate, and
   d. from 10 to 50 parts by weight per 100 parts of the mixture (a), (b) and (c), of silica filler.

* * * * *